(12) United States Patent
Crabtree et al.

(10) Patent No.: US 12,225,055 B2
(45) Date of Patent: *Feb. 11, 2025

(54) SYSTEM AND METHOD FOR SECURE EVALUATION OF CYBER DETECTION PRODUCTS

(71) Applicant: QOMPLX LLC, Reston, VA (US)

(72) Inventors: Jason Crabtree, Vienna, VA (US); Andrew Sellers, Monument, CO (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,967

(22) Filed: Mar. 24, 2023

(65) Prior Publication Data

US 2023/0308487 A1    Sep. 28, 2023

Related U.S. Application Data

(63) Continuation of application No. 17/008,351, filed on Aug. 31, 2020, now Pat. No. 11,637,866, which is a
(Continued)

(51) Int. Cl.
| | |
|---|---|
| *H04L 9/40* | (2022.01) |
| *G06F 16/2458* | (2019.01) |
| *G06F 16/951* | (2019.01) |

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1425; H04L 63/1441; G06F 16/2477; G06F 16/951
See application file for complete search history.

(56) References Cited

U.S. PATENT DOCUMENTS

| | | |
|---|---|---|
| 5,669,000 A | 9/1997 | Jessen et al. |
| 6,256,544 B1 | 7/2001 | Weissinger |

(Continued)

FOREIGN PATENT DOCUMENTS

| | | |
|---|---|---|
| WO | 2014159150 A1 | 10/2014 |
| WO | 2017075543 A1 | 5/2017 |

OTHER PUBLICATIONS

Pavel Čeleda, Jakub Čegan, Jan Vykopal, Daniel Tovarňák "KYPO—A Platform for Cyber Defence Exercises", 2015, M&S Support to Operational Tasks including War Gaming, Logistics, Cyber Defence, NATO Science and Technology Organization, 12 pages. (Year: 2015).*

(Continued)

*Primary Examiner* — Catherine Thiaw
(74) *Attorney, Agent, or Firm* — Galvin Patent Law LLC; Brian R. Galvin

(57) ABSTRACT

A system and method for the secure and private demonstration of cloud-based cyber-security tools. Using an advanced sandboxing design patterns, isolated instances of virtual networks allow a potential client to compare their existing cyber defense tools against a set of cloud-based tools. Capitalizing on non-persistent and secure sandboxes allow the invention to demonstrate fully functional and devastating cyber-attacks while guaranteeing strict privacy and security to both existing customers and potential ones. Additionally, instantiating separate sandboxed observed systems in a single multi-tenant infrastructure provide each customer with the ability to rapidly create actual representations of their enterprise environment offering the most realistic and accurate demonstration and comparison between products.

6 Claims, 11 Drawing Sheets

Related U.S. Application Data continuation-in-part of application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, which is a continuation-in-part of application No. 15/887,496, filed on Feb. 2, 2018, now Pat. No. 10,783,241, which is a continuation-in-part of application No. 15/823,285, filed on Nov. 27, 2017, now Pat. No. 10,740,096, which is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/887,496 is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 16/855,724 is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, now Pat. No. 10,609,079, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, which is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, and a continuation-in-part of application No. 15/141,752, filed on Apr. 28, 2016, now Pat. No. 10,860,962, said application No. 15/849,901 is a continuation-in-part of application No. 15/835,312, filed on Dec. 7, 2017, now Pat. No. 11,055,451, which is a continuation-in-part of application No. 15/186,453, filed on Jun. 18, 2016, now abandoned, said application No. 16/248,133 is a continuation-in-part of application No. 15/813,097, filed on Nov. 14, 2017, now abandoned, which is a continuation-in-part of application No. 15/616,427, filed on Jun. 7, 2017, now abandoned, said application No. 16/248,133 is a continuation-in-part of application No. 15/806,697, filed on Nov. 8, 2017, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, said application No. 15/806,697 is a continuation-in-part of application No. 15/343,209, filed on Nov. 4, 2016, now Pat. No. 11,087,403, which is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, which is a continuation-in-part of application No. 15/206,195, filed on Jul. 8, 2016, now abandoned, said application No. 16/248,133 is a continuation-in-part of application No. 15/673,368, filed on Aug. 9, 2017, now abandoned, which is a continuation-in-part of application No. 15/376,657, filed on Dec. 13, 2016, now Pat. No. 10,402,906.

(56) References Cited

U.S. PATENT DOCUMENTS

| | | |
|---|---|---|
| 7,072,863 B1 | 7/2006 | Phillips et al. |
| 7,657,406 B2 | 2/2010 | Tolone et al. |
| 7,698,213 B2 | 4/2010 | Lancaster |
| 7,739,653 B2 | 6/2010 | Venolia |
| 8,065,257 B2 | 11/2011 | Kuecuekyan |
| 8,145,761 B2 | 3/2012 | Liu et al. |
| 8,281,121 B2 | 10/2012 | Nath et al. |
| 8,615,800 B2 | 12/2013 | Baddour et al. |
| 8,788,306 B2 | 7/2014 | Delurgio et al. |
| 8,793,758 B2 | 7/2014 | Raleigh et al. |
| 8,914,878 B2 | 12/2014 | Burns et al. |
| 8,997,233 B2 | 3/2015 | Green et al. |
| 9,134,966 B2 | 9/2015 | Brock et al. |
| 9,141,360 B1 | 9/2015 | Chen et al. |
| 9,306,971 B2 | 4/2016 | Altman et al. |
| 9,432,389 B1 | 8/2016 | Khalid et al. |
| 9,477,837 B1 | 10/2016 | Langton et al. |
| 9,571,519 B2 | 2/2017 | Adams et al. |
| 9,602,530 B2 | 3/2017 | Ellis et al. |
| 9,654,495 B2 | 5/2017 | Hubbard et al. |
| 9,672,355 B2 | 6/2017 | Titonis et al. |
| 9,762,443 B2 | 9/2017 | Dickey |
| 9,887,933 B2 | 2/2018 | Lawrence, III |
| 9,946,517 B2 | 4/2018 | Talby et al. |

(56) References Cited

U.S. PATENT DOCUMENTS

| | | | |
|---|---|---|---|
| 10,061,635 B2 | 8/2018 | Ellwein | |
| 10,083,624 B2 | 9/2018 | Brueckner et al. | |
| 10,102,480 B2 | 10/2018 | Dirac et al. | |
| 10,210,246 B2 | 2/2019 | Stojanovic et al. | |
| 10,210,255 B2 | 2/2019 | Crabtree et al. | |
| 10,230,757 B2 | 3/2019 | Bobritsky | |
| 10,248,910 B2 | 4/2019 | Crabtree et al. | |
| 10,318,882 B2 | 6/2019 | Brueckner et al. | |
| 10,367,829 B2 | 7/2019 | Huang et al. | |
| 10,387,631 B2 | 8/2019 | Duggal et al. | |
| 10,447,728 B1 | 10/2019 | Steinberg | |
| 2005/0289072 A1 | 12/2005 | Sabharwal | |
| 2006/0021029 A1* | 1/2006 | Brickell | G06F 21/51 726/22 |
| 2006/0229741 A1* | 10/2006 | Achanta | G06F 9/4406 700/23 |
| 2007/0265835 A1* | 11/2007 | Smithline | G06F 21/53 704/200.1 |
| 2008/0016339 A1* | 1/2008 | Shukla | G06F 21/54 713/164 |
| 2010/0122343 A1* | 5/2010 | Ghosh | G06F 9/45545 726/23 |
| 2010/0138639 A1 | 6/2010 | Shah et al. | |
| 2013/0232576 A1 | 9/2013 | Karnikis et al. | |
| 2013/0283364 A1* | 10/2013 | Chang | G06F 9/45558 726/12 |
| 2013/0304623 A1 | 11/2013 | Kumar et al. | |
| 2014/0279762 A1 | 9/2014 | Xaypanya et al. | |
| 2016/0004858 A1 | 1/2016 | Chen et al. | |
| 2016/0099960 A1 | 4/2016 | Gerritz et al. | |
| 2016/0140519 A1 | 5/2016 | Trepca et al. | |
| 2016/0275123 A1 | 9/2016 | Lin et al. | |
| 2016/0350442 A1 | 12/2016 | Crosby | |
| 2016/0364307 A1 | 12/2016 | Garg et al. | |
| 2017/0003995 A1* | 1/2017 | Hu | G06F 9/45558 |
| 2017/0063896 A1 | 3/2017 | Muddu et al. | |

OTHER PUBLICATIONS

Liberios Vokorokos, Anton Baláž, Branislav Madoš "Application Security through Sandbox Virtualization", Acta Polytechnica Hungarica, vol. 12, No. 1, 2015, 83-101 (Year: 2015).*

Ben-Yehuda, Muli, Day, Michael D., Dubitzky, Zvi, et al. The turtles project: Design and implementation of nested virtualization. In : 9th USENIX Symposium on Operating Systems Design and Implementation (OSDI 10). 2010. (Year: 2010).*

Beham, M., Vlad, M., & Reiser, H. P. (Jun. 2013). Intrusion detection and honeypots in nested virtualization environments. In 2013 43rd Annual IEEE/IFIP international conference on dependable systems and networks (DSN) (pp. 1-6). IEEE. (Year: 2013).*

* cited by examiner

SYSTEM AND METHOD FOR SECURE EVALUATION OF CYBER DETECTION PRODUCTS

CROSS-REFERENCE TO RELATED APPLICATIONS

Priority is claimed in the application data sheet to the following patents or patent applications, each of which is expressly incorporated herein by reference in its entirety:
Ser. No. 17/008,351
Ser. No. 17/000,504
Ser. No. 16/855,724
Ser. No. 16/836,717
Ser. No. 16/777,270
Ser. No. 16/720,383
Ser. No. 16/412,340
Ser. No. 16/267,893
Ser. No. 16/248,133
Ser. No. 15/887,496
Ser. No. 15/849,901
Ser. No. 15/835,312
Ser. No. 15/835,436
Ser. No. 15/823,363
Ser. No. 15/823,285
Ser. No. 15/818,733
Ser. No. 15/813,097
Ser. No. 15/806,697
Ser. No. 15/790,457
Ser. No. 15/790,327
Ser. No. 15/788,718
Ser. No. 15/788,002
Ser. No. 15/787,601
Ser. No. 62/568,291
Ser. No. 62/568,312
Ser. No. 62/568,298
Ser. No. 15/725,274
Ser. No. 62/568,305
Ser. No. 62/568,307
Ser. No. 15/673,368
Ser. No. 15/655,113
Ser. No. 15/616,427
Ser. No. 15/376,657
Ser. No. 15/343,209
Ser. No. 15/237,625
Ser. No. 15/229,476
Ser. No. 15/206,195
Ser. No. 15/186,453
Ser. No. 15/166,158
Ser. No. 15/141,752
Ser. No. 15/091,563
Ser. No. 14/986,536
Ser. No. 14/925,974

BACKGROUND OF THE INVENTION

Field of the Invention

The disclosure relates to the field of computer management, and more particularly to the field of cybersecurity demonstrations.

Discussion of the State of the Art

As traditional technology shifts to cloud-computing models, so do the on-premise applications that were once the only solution. Now that companies are transitioning to cloud-based cyber detection products, there is a confidence barrier that most cyber detection providers do not offer. Typically, there are two ways to make a decision regarding an enterprise network software product. The first option is to deploy the product on the enterprise network, which requires a full reconfiguration of the enterprise network that is both time-consuming and labor-intensive, and should it not meet the needs of the organization, requires another full reconfiguration to revert the network to its original configuration. The second option is to watch or try a product demonstration in which the software might perform very well only in a narrow test environment, not representing the complexity of the network to which it will be applied. Neither case ideal, and neither allows the buyer to compare detection rates with other services.

What is needed is a system and method to demonstrate and compare cyber detection products in real time and on realistic models of a customer's existing network without exposing and making vulnerable either the customer's network or the cloud-based cybersecurity defense platform whose software is being tested.

SUMMARY OF THE INVENTION

Accordingly, the inventor has conceived, and reduced to practice, a system and method for the secure and private demonstration of cloud-based cyber-security tools in real time and on realistic models configurable by a customer's IT professionals to represent portions of the customer's existing network environment. Using an advanced version of sandboxing, compartmentalized instances of virtual networks allow a potential client to compare their existing cyber defense tools against a set of cloud-based tools. Capitalizing on non-persistent and secure sandboxes allow the invention to demonstrate fully functional and devastating cyber-attacks while guaranteeing strict privacy and security to both existing customers and potential ones. Additionally, instantiating separate sandboxed observed systems inside a single multi-tenant infrastructure provide each customer with the ability to rapidly create actual representations of their enterprise environment offering the most realistic and accurate demonstration and comparison between products and observe detections of malicious activity conducted by red teams for testing purposes.

According to a preferred embodiment, a system for secure evaluation of cybersecurity tools is disclosed, comprising: a computing device comprising a memory and a processor; a sandbox environment manager comprising a first plurality of programming instructions stored in the memory and operating on the processor, wherein the first plurality of programming instructions, when operating on the processor, cause the computing device to: receive a configuration for a virtual computer network, the virtual computer network comprising one or more virtual domain controllers, one or more member servers, and one or more workstations; create a sandbox environment for the testing of a virtual computer network, wherein the sandbox environment is provided with a set of controlled computing resources of the computing device for its operation and is prevented from accessing any other computing resources of the computing device; and create a observed system within the sandbox environment, the observed system comprising an isolated instance of the virtual computer, one or more cybersecurity defense tools, and one or more instances of malware; an observed system manager comprising a second plurality of programming instructions stored in the memory and operating on the processor, wherein the second plurality of programming instructions, when operating on the processor, cause the computing device to: operate the observed system as a test of the virtual computer network and the cybersecurity defense tools against the malware; allow a user to monitor and change the operation of the observed system during operation; and display results from the test of the observed system.

According to another preferred embodiment, a method for secure evaluation of cybersecurity tools is disclosed, comprising the steps of: receiving a configuration for a virtual computer network, the virtual computer network comprising one or more virtual domain controllers, one or more member servers, and one or more workstations; creating a sandbox environment on a computing device for the testing of a virtual computer network, wherein the sandbox environment is provided with a set of controlled computing resources of the computing device for its operation and is prevented from accessing any other computing resources of the computing device; creating a observed system within the sandbox environment, the observed system comprising an isolated instance of the virtual computer, one or more cybersecurity defense tools, and one or more instances of malware; operating the observed system as a test of the virtual computer network and the cybersecurity defense tools against the malware; allowing a user to monitor and change the operation of the observed system during operation; and displaying results from the test of the observed system.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE DRAWING FIGURES

Figure 1:
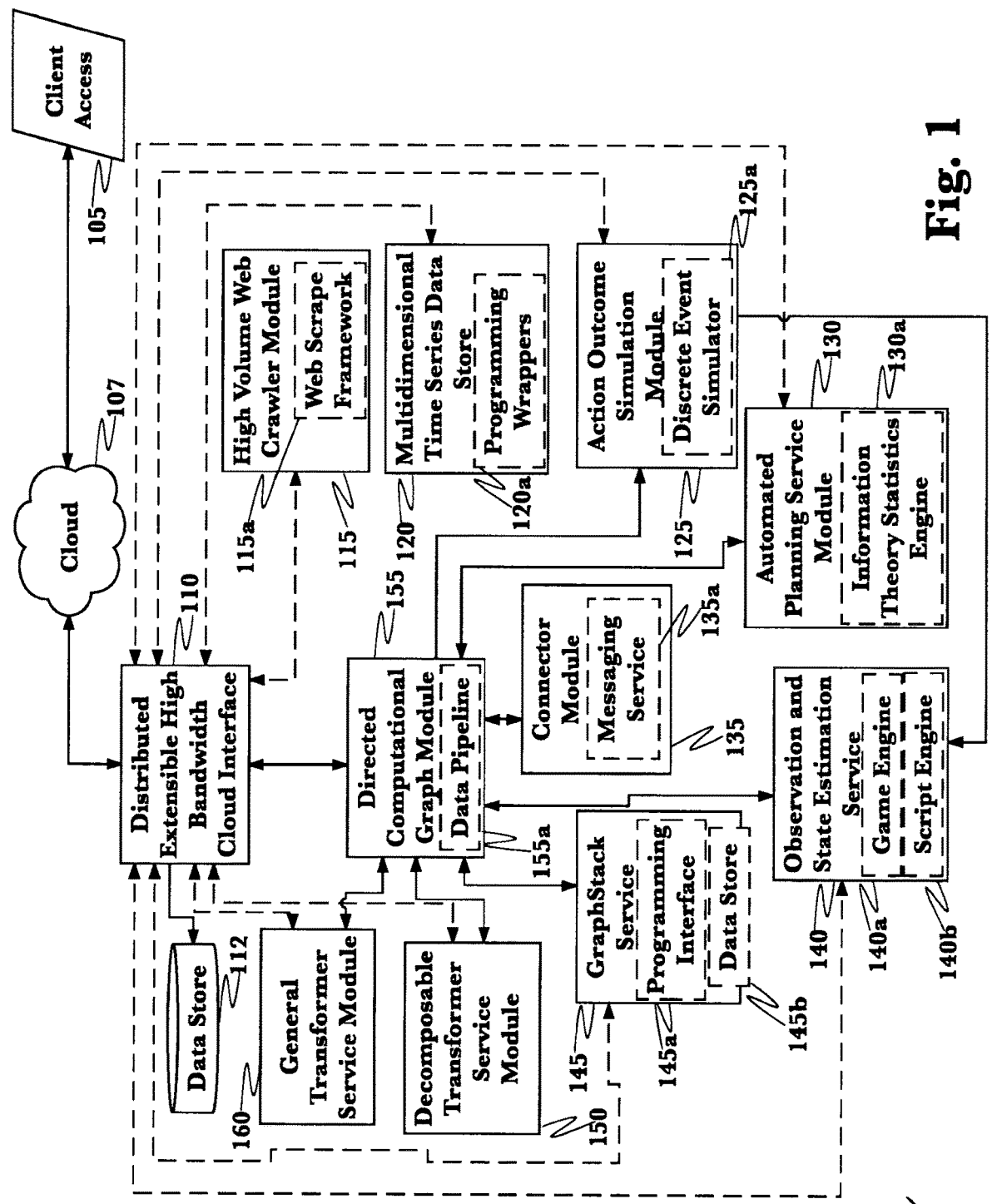
FIG. 1 is a diagram of an exemplary architecture of a business operating system according to an embodiment of the invention.

The inventor has conceived, and reduced to practice, a system and method for the secure and private demonstration of cloud-based cyber-security tools in real time and on realistic models configurable by a customer's IT professionals to represent portions of the customer's existing network environment. Using an advanced version of sandboxing, compartmentalized instances of virtual networks allow a potential client to compare its existing cyber defense tools against a set of cloud-based tools. Capitalizing on non-persistent and secure sandboxes allow the invention to demonstrate fully functional and devastating cyber-attacks while guaranteeing strict privacy and security to both existing customers and potential ones. Additionally, instantiating separate sandboxed observed systems in a single multi-tenant infrastructure provide each customer with the ability to rapidly create actual representations of its enterprise environment offering the most realistic and accurate demonstration and comparison between products.

The process begins with gathering of customer information such as contact information, organization information, and log in credentials, and certain technical operating parameters, date and times, and desired services. If gathered using an online form, the request can initiate automated tasks as the request is received by extracting the fields from the web-form and sending a series of automated tasks based on the field's input. For example, initial environment construction may be performed including creation of a subnet sufficient for the number of devices requested by the user and public facing DNS records. Such tasks may be completed manually in some embodiments.

A sandbox environment is created for the client, within which any number of compartmentalized instances of the client's computing network may be created, each isolated instance optionally having its own set of configurations of the virtual computer network, and having a set of cybersecurity malware and cybersecurity detection tools to be tested. In essence, each compartmentalized instance is a sandbox within the sandbox environment, providing a second layer of security against the cybersecurity malware being tested, particularly those types of malware specifically designed to escape or penetrate sandboxing.

Each compartmentalized instance, also called herein an "observed system," is created within the sandbox environment. Allowing the client to create separate observed systems allows the client to test different network configurations, settings, and cybersecurity defense tools against different types of malware to make compare and contrast decisions about cybersecurity options on its computer network.

Once the sandbox environment is created, the user, typically an information technology (IT) professional employed by a business enterprise, may now log in to the sandbox and begin uploading configuration files and settings as well as baseline images from which to build servers, endpoints, and other networked devices. According to one embodiment, the user may log in to the virtualized environment over HTTP: Port 80, HTTPS: Port 443, Remote Desktop Protocol (RDP): Port 3389 (TCP), and the baseline images or other large files may use File Transfer Protocol (FTP): Port 21, Trivial File Transfer Protocol (TFTP): Port 69. Other protocols and ports known to those skilled in the art may be utilized depending on the desired speed, security, or other factors determined by the implementing party.

Once all configurations and images are uploaded, the user may then use a user interface to configure, build, assign, and arrange an observed system comprising a virtual computer network representative of all of, or a portion of, the customer's real-world network complete with domain controllers, servers, endpoints, and other networked devices. Once complete, the user will engage a button or link (or any other means to activate a batch file, script file, or commands otherwise known as a silent install in the industry) that will install the necessary cyber-defense agents in the virtual network. These agents may comprise, in some embodiments, monitoring agents for services such as Kerberos, Active Directory, network traffic, or packet capture.

With the construction of the observed system complete, the customer may log in to cyber defense tools available in the system, which may come in the form of an online dashboard. Other means of interacting with the cloud-based service may be offered and an online dashboard should not be considered the only way. Because the cybersecurity defense tools and services under test are cloud-based and therefore isolated from the observed system, the user should be able to log in to the dashboard from within the observed system or remotely (e.g., from the user's real-world network environment, or from any Internet-connected device for that matter). From there, the user can run cyber-attacks on the observed system, compartmentalized within the virtual environment, and compare the results between the user's existing cyber security toolset and the new cyber security toolset being demonstrated.

When the demo is complete, the customer may delete any of the observed systems or the entire sandbox environment, customer profile, and any other changes done to the cloud-based service. During the entire lifespan of the sandboxed environment, the cloud-based cyber detection system still provides services to actual customers and additional potential customers as sandboxing may be instanced multiple times and because sandboxing requires resources and hard disk space orders of magnitudes smaller than traditional virtual environments along with operational agility to instantiate and deallocate customer environments according to an operations tempo of short customer trial periods consistent with business requirements.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices.

For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane may transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

For example, the Information Assurance department is notified by the system 100 that principal X is using credentials K (Kerberos Principal Key) never used by it before to access service Y. Service Y utilizes these same credentials to access secure data on data store Z. This correctly generates an alert as suspicious lateral movement through the network and will recommend isolation of X and Y and suspension of K based on continuous baseline network traffic monitoring by the multidimensional time series data store 120 programmed to process such data 120*a*, rigorous analysis of the network baseline by the directed computational graph 155 with its underlying general transformer service module 160 and decomposable transformer service module 150 in conjunction with the AI and primed machine learning capabilities 130*a* of the automated planning service module 130 which had also received and assimilated publicly available from a plurality of sources through the multi-source connection APIs of the connector module 135. Ad hoc simulations of these traffic patterns are run against the baseline by the action outcome simulation module 125 and its discrete event simulator 125*a* which is used here to determine probability space for likelihood of legitimacy. The system 100, based on this data and analysis, was able to detect and recommend mitigation of a cyberattack that represented an existential threat to all business operations, presenting, at the time of the attack, information most needed for an actionable plan to human analysts at multiple levels in the mitigation and remediation effort through use of the observation and state estimation service 140 which had also been specifically preprogrammed to handle cybersecurity events 140*b*

Figure 2:
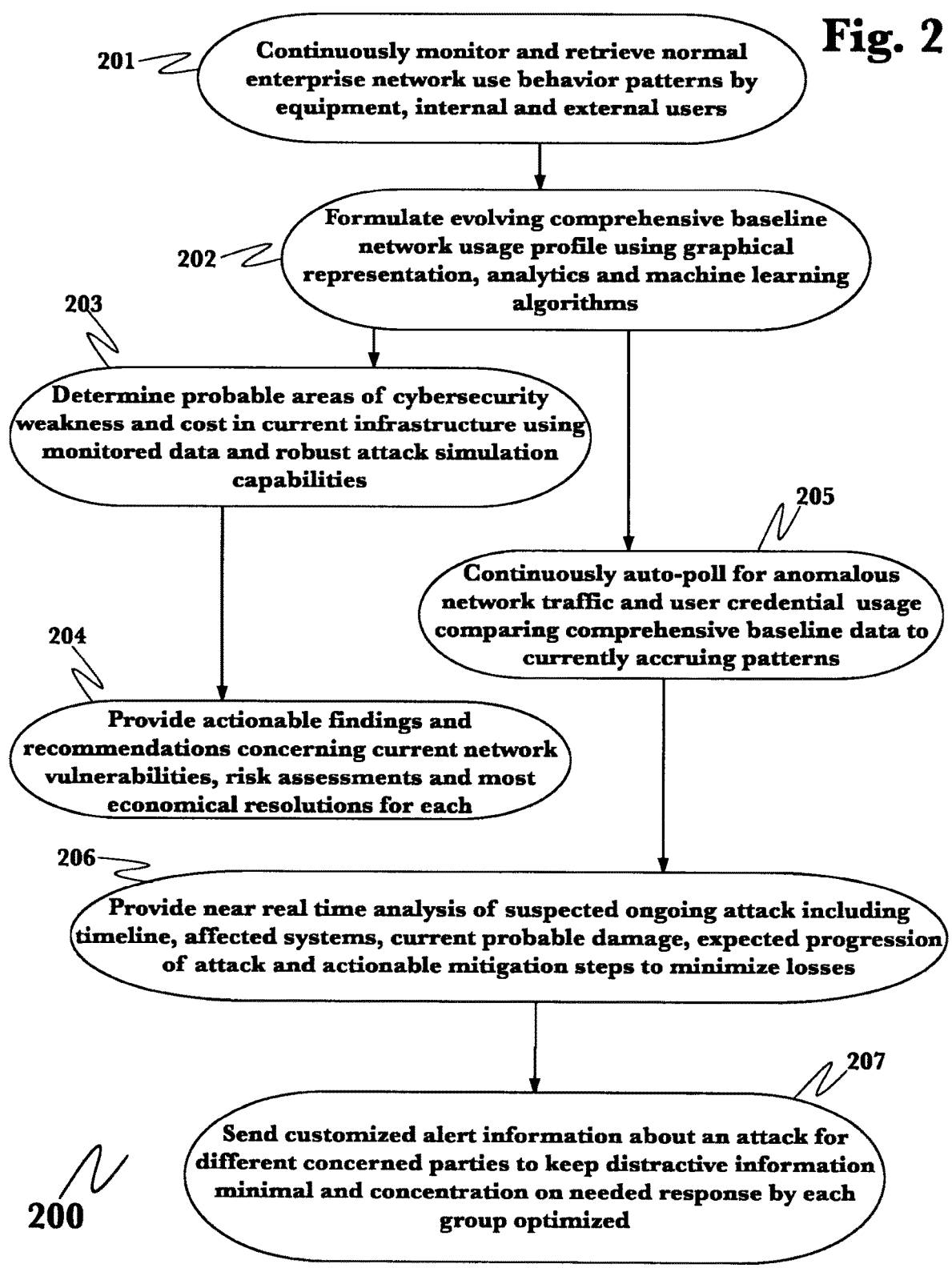
FIG. 2 is a flow diagram of an exemplary function of the business operating system in the detection and mitigation of predetermining factors leading to and steps to mitigate ongoing cyberattacks.

FIG. 2 is a flow diagram of an exemplary function of the business operating system in the detection and mitigation of predetermining factors leading to and steps to mitigate ongoing cyberattacks 200. The system continuously retrieves network traffic data 201 which may be stored and preprocessed by the multidimensional time series data store 120 and its programming wrappers 120*a*. All captured data are then analyzed to predict the normal usage patterns of network nodes such as internal users, network connected systems and equipment and sanctioned users external to the enterprise boundaries for example off-site employees, contractors and vendors, just to name a few likely participants. Of course, normal other network traffic may also be known to those skilled in the field, the list given is not meant to be exclusive and other possibilities would not fall outside the design of the invention. Analysis of network traffic may include graphical analysis of parameters such as network item to network usage using specifically developed programming in the graphstack service 145, 145*a*, analysis of usage by each network item may be accomplished by specifically pre-developed algorithms associated with the directed computational graph module 155, general transformer service module 160 and decomposable service module 150, depending on the complexity of the individual usage profile 201. These usage pattern analyses, in conjunction with additional data concerning an enterprise's network topology; gateway firewall programming; internal firewall configuration; directory services protocols and configuration; and permissions profiles for both users and for access to sensitive information, just to list a few non-exclusive examples may then be analyzed further within the automated planning service module 130, where machine learning techniques which include but are not limited to information theory statistics 130*a* may be employed and the action outcome simulation module 125, specialized for predictive simulation of outcome based on current data 125*a* may be applied to formulate a current, up-to-date and continuously evolving baseline network usage profile 202. This same data would be combined with up-to-date known cyberattack methodology reports, possibly retrieved from several divergent and exogenous sources through the use of the multi-application programming interface aware connector module 135 to present preventative recommendations to the enterprise decision makers for network infrastructure changes, physical and configuration-based to cost effectively reduce the probability of a cyberattack and to significantly and most cost effectively mitigate data exposure and loss in the event of attack 203, 204.

While some of these options may have been partially available as piecemeal solutions in the past, we believe the ability to intelligently integrate the large volume of data from a plurality of sources on an ongoing basis followed by predictive simulation and analysis of outcome based upon that current data such that actionable, business practice efficient recommendations can be presented is both novel and necessary in this field.

Once a comprehensive baseline profile of network usage using all available network traffic data has been formulated, the specifically tasked business operating system continuously polls the incoming traffic data for activities anomalous to that baseline as determined by pre-designated boundaries 205. Examples of anomalous activities may include a user attempting to gain access several workstations or servers in rapid succession, or a user attempting to gain access to a domain server of server with sensitive information using random userIDs or another user's userID and password, or attempts by any user to brute force crack a privileged user's password, or replay of recently issued ACTIVE DIRECTORY™/Kerberos ticket granting tickets, or the presence on any known, ongoing exploit on the network or the introduction of known malware to the network, just to name a very small sample of the cyberattack profiles known to those skilled in the field. The invention, being predictive as well as aware of known exploits is designed to analyze any anomalous network behavior, formulate probable outcomes of the behavior, and to then issue any needed alerts regardless of whether the attack follows a published exploit specification or exhibits novel characteristics deviant to normal network practice. Once a probable cyberattack is detected, the system then is designed to get needed information to responding parties 206 tailored, where possible, to each role in mitigating the attack and damage arising from it 207. This may include the exact subset of information included in alerts and updates and the format in which the information is presented which may be through the enterprise's existing security information and event management system. Network administrators, then, might receive information such as but not limited to where on the network the attack is believed to have originated, what systems are believed currently affected, predictive information on where the attack may progress, what enterprise information is at risk and actionable recommendations on repelling the intrusion and mitigating the damage, whereas a chief information security officer may receive alert including but not limited to a timeline of the cyberattack, the services and information believed compromised, what action, if any has been taken to mitigate the attack, a prediction of how the attack may unfold and the recommendations given to control and repel the attack 207, although all parties may access any network and cyberattack information for which they have granted access at any time, unless compromise is suspected. Other specifically tailored updates may be issued by the system 206, 207.

Figure 3:
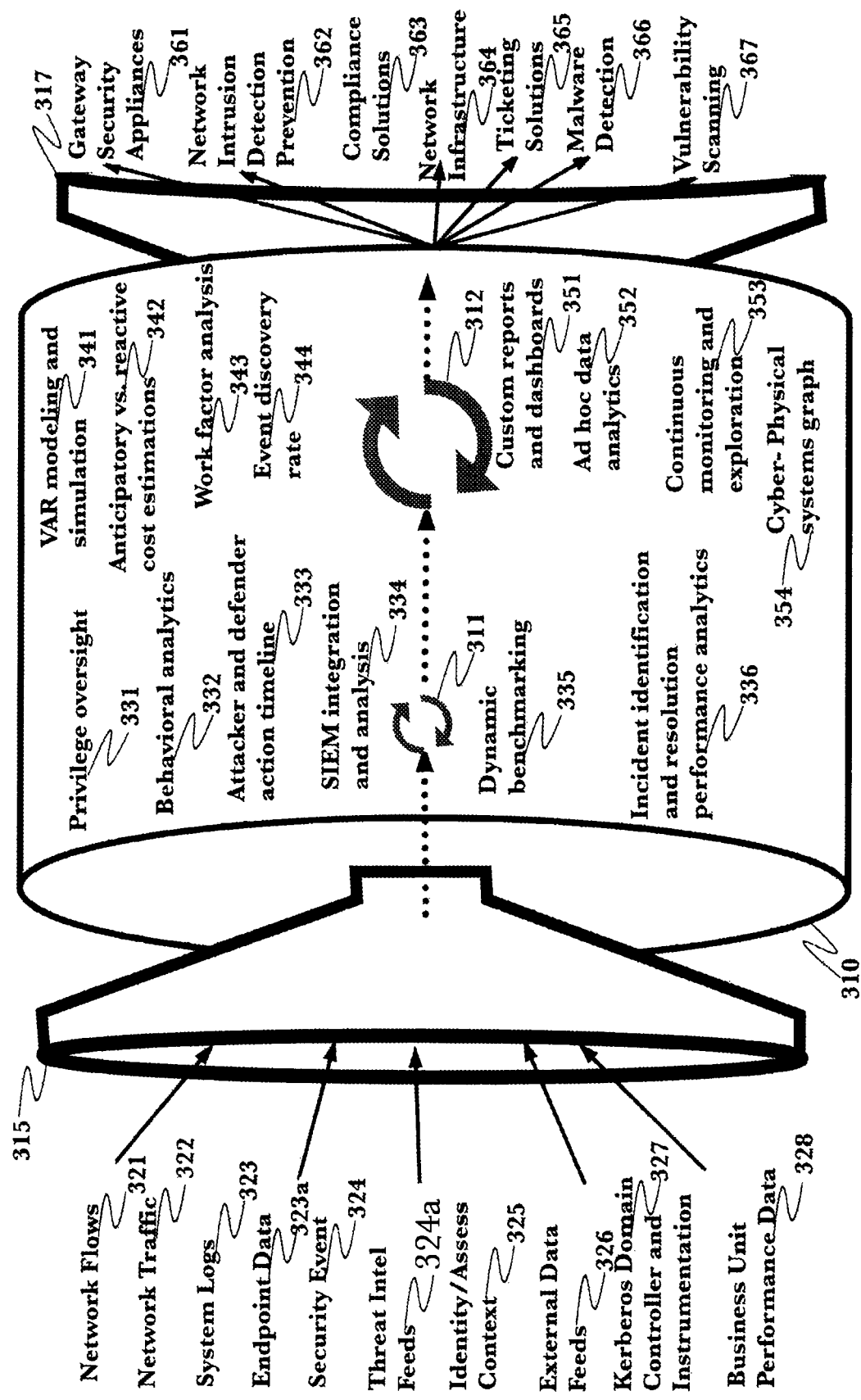
FIG. 3 is a process diagram showing business operating system functions in use to mitigate cyberattacks.

FIG. 3 is a process diagram showing business operating system functions in use to mitigate cyberattacks. This diagram features a plurality of inputs 310 and outputs 317 of a business operating system function 300 designed to mitigate cyberattacks. Input network data 310 which may include network flow patterns 321, the origin and destination of each piece of measurable network traffic 322, system logs from servers and workstations on the network 323, endpoint data 323a, any security event log data from servers or available security information and event (STEM) systems 324, external threat intelligence feeds 324a, identity and assessment context 325, external network health or cybersecurity feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367. These examples are, of course, only a subset of the possible uses of the system, they are exemplary in nature and do not reflect any boundaries in the capabilities of the invention.

Figure 4:
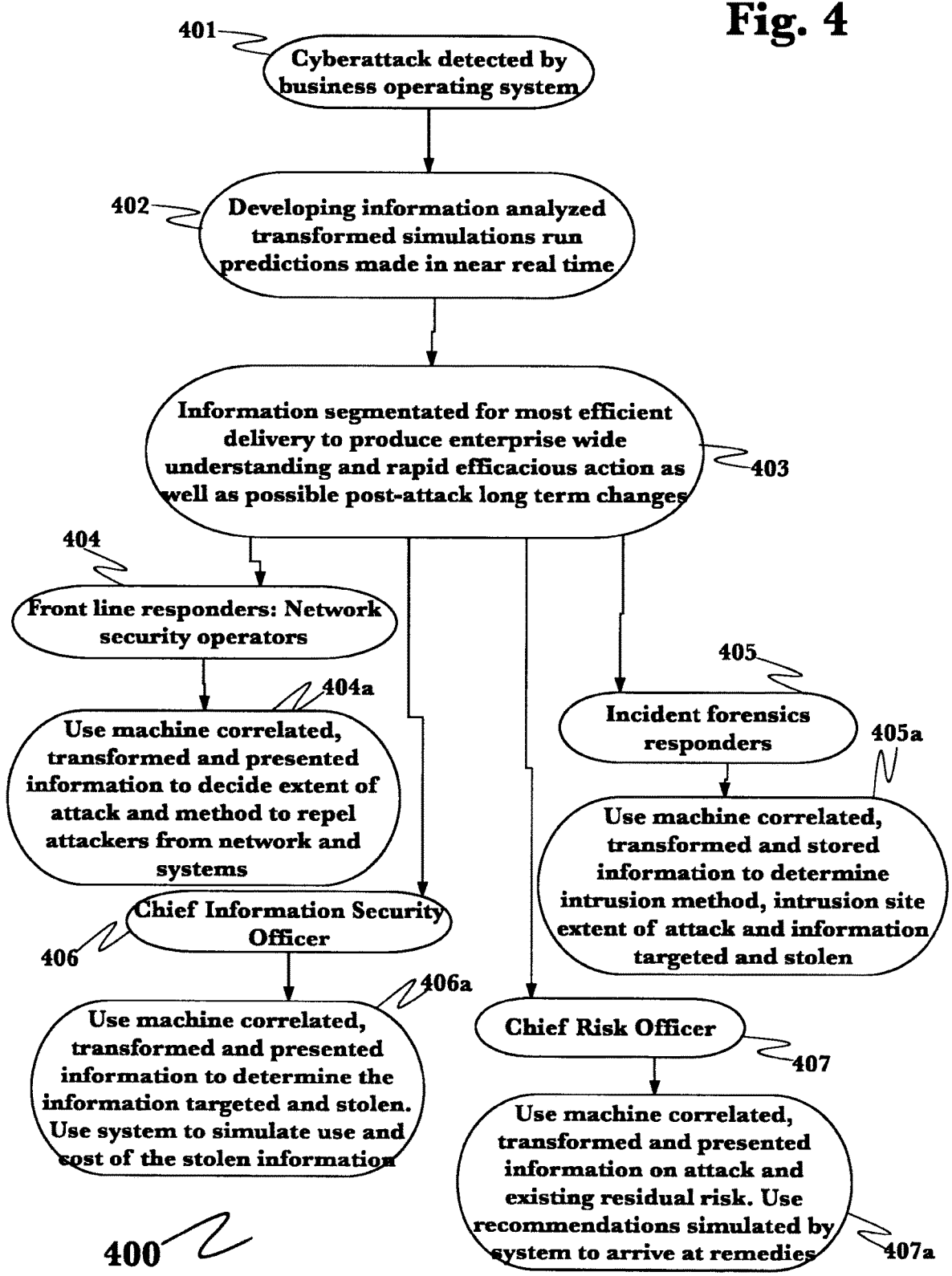
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused embodiment may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404a to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406a what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405a to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407*a* was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

As the embodiment is expressively scriptable in a large number of programmed capabilities, which include data presentation, the segmentation of information, parties chosen to receive information, and the information received would be expected to vary, perhaps significantly, between corporate clients of business operating system cybersecurity embodiments depending on individual corporate policies, philosophies and make-up, just to name a few examples.

Figure 5:
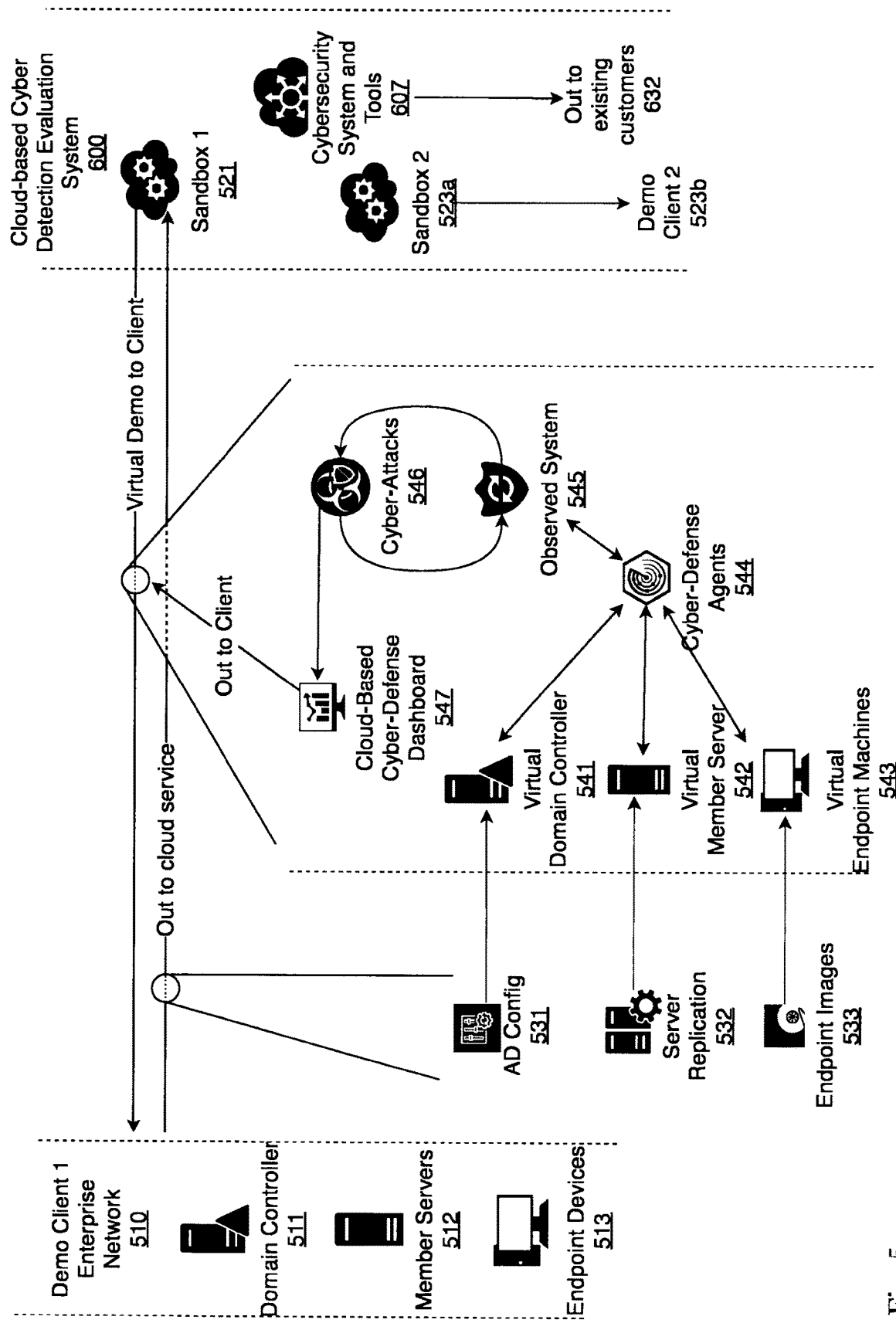
FIG. 5 is a diagram of an exemplary system for the secure evaluation of cyber detection products.

FIG. 5 is a diagram of an exemplary system for the secure evaluation of cyber detection products. In this figure, a potential client is requesting to demo a cloud-based cyber detection service. The potential client's network 510 comprises typical devices such as a domain controller 511, member servers (such as mail or file servers) 512, and endpoint devices 513. The cloud-based cyber detection evaluation system 520 runs on the backbone of the service's primary hardware 522*a* which still serves active customers 522*b*. This is possible because it uses sandbox instances 521, 523*a* which unlike virtualization does not require a significant amount of RAM or disk space and is easier to set up. More importantly, however, what happens inside a sandbox is not visible outside of the sandbox and is not persisted when the sandbox exits. This additional security is extremely important when creating test environments with live malware and viruses as well as providing the potential customer with maximum privacy. Additionally, because the resource requirement is so low, many sandbox instances may be run simultaneously providing demonstrations to multiple clients 523*b*.

Once a potential client requests a demonstration a sandbox is instantiated. The client is provided the opportunity to construct an accurate representation of its enterprise network 510 within this sandbox 521, which is a feature that other cyber detection platforms do not offer. The client's real-world network configuration, or a portion thereof, may be uploaded through several means, including but not limited to uploading the client's Active Directory configurations 531, performing server replications as one typically would do locally 532, and uploading preconfigured system images 533. As the client uploads this plurality of configurations and images 531, 532, 533, virtual copies 541, 542, 543 of their network devices 511, 512, 513 are generated in the virtual sandbox environment 521. The cyber detection agents 544 are automatically (using autorun batch files according to one embodiment) installed. These agents comprise Kerberos monitoring agents, Active Directory agents, and continuous monitoring agents, among others. The configuration of the client's network may include installation of existing on-premise cybersecurity software, or connections to an existing cloud-based cybersecurity platform, depending on the client's real-world network configuration. This feature allows direct comparisons between the client's existing cybersecurity defenses and the cloud-based cybersecurity platform being demonstrated.

Where the client wants to test a hypothetical network, various means may be provided to the client to configure such a hypothetical network including but not limited to selection of pre-configured network configurations or a graphical user interface (GUI) that allows for click-and-drag construction of a virtual network using on-screen icons representing network components.

With the client's virtual network configured and connected to the cloud-based cyber detection evaluation system 520 monitoring the observed system 545, the client is presented with a dashboard 547 to run a plurality of cyber-attacks 546 and compare the detection rates (positive detections, false-positives, false-negatives, etc.) between the client's existing cyber security software and the new cloud-based cyber detection evaluation system 520.

When the client is finished with the demo, the cloud-based cyber detection evaluation system 520 deletes the sandbox instance and any information pertaining to the client's network 510 and any unwanted software (viruses, malware, etc.) is extinguished. For additional security, the portions of any non-volatile storage containing the sandbox may be overwritten to prevent recovery.

Figure 6:
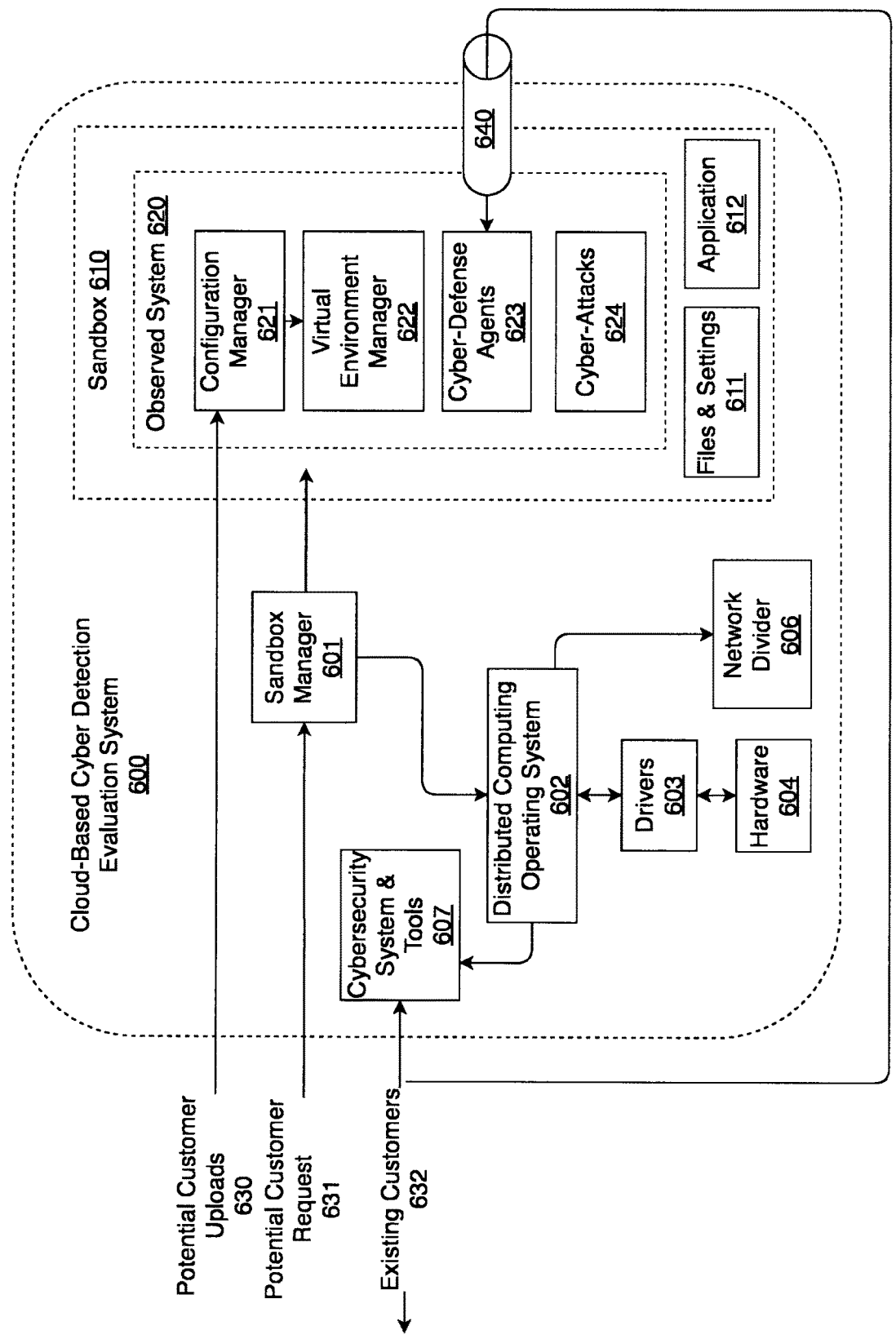
FIG. 6 is a diagram of an exemplary system architecture of a secure evaluation platform.

FIG. 6 is a diagram of an exemplary system architecture of a secure evaluation platform. In order to provide each potential customer and each existing customer with secure and private cyber detection evaluation service a distributed computing platform is utilized. The evaluation system 600 receives a request 631 from a potential customer. This could be done by filling out a web form, submitting a request with customer service, or other means by which the customer provides basic details. These details comprise how many domains and network devices are to be set up, what services are requested, and basic details about the client to generate a temporary account.

The sandbox manager 601 receives these details and sends a request to the network divider 606 to create a new subnet for the sandbox 610, enough for the number of domains and network devices specified in the details. Once the subnet is created, a sandbox 610 (a new sandbox for each customer) is instantiated by allocating the needed resources from the OS kernel 602 and application layer 612 while also organizing instances of dependencies such as files and settings 611. The sandbox 610 does not have access to the primary system's drivers 603 or hardware 604 and thus cannot infect the primary system during the lifetime of the sandbox 610. The regular cyber detection service 607 provided to existing customers 632 is unaffected by any sandbox.

With the required architecture now in place for the demonstration, an account for the potential customer is generated and log in credentials are sent to the customer. The customer would then upload configuration files and baseline images 630 to the configuration manager 621. At this point, no viruses, malware, or other cyber-attacks 624 are possible as those files are not accessible by any operating system. The uploaded configuration files and baseline images 630 are used to stand up virtual domain controllers, servers, and endpoint machines. A virtual environment manager 622 allows the customer to arrange, connect, and build a virtual enterprise network representative of their actual real-world network. Should the customer want to compare security tools, he or she would need to have the customer network's existing cybersecurity tools set up in this virtual environment. In most cases, this set up would be a trivial task that is already accomplished by having it installed on the baseline image, as most organizations do. Other methods known in the art may be used, but baseline images are the most common.

When the customer completes this configuration, cyber-defense agents 623 are installed (via batch files or other automated processes) as part of the new cyber detection tools 607. While this sandbox 610 exists in parallel with the actual cyber detection tools 607, the sandbox 610 and the observed system (the virtual network environment) 620 are logically operating outside of the evaluation system 600. Therefore, communication between the observed system 620 and the offered cyber-defense service 607 are tunneled 640 through the evaluation system 600. This compartmentalization assists with the security and privacy needed for this application.

The customer may now run a series of cyber-attacks 624 as if it was an existing customer 632, and view the results from the cyber-detection service 607 and from their own tools. Upon satisfactory completion of the demonstration, the sandbox manager 601 and network divider 606 reverse the changes they made and the cloud-based cyber detection evaluation system 600 returns to its pre-sandbox state.

Figure 7:
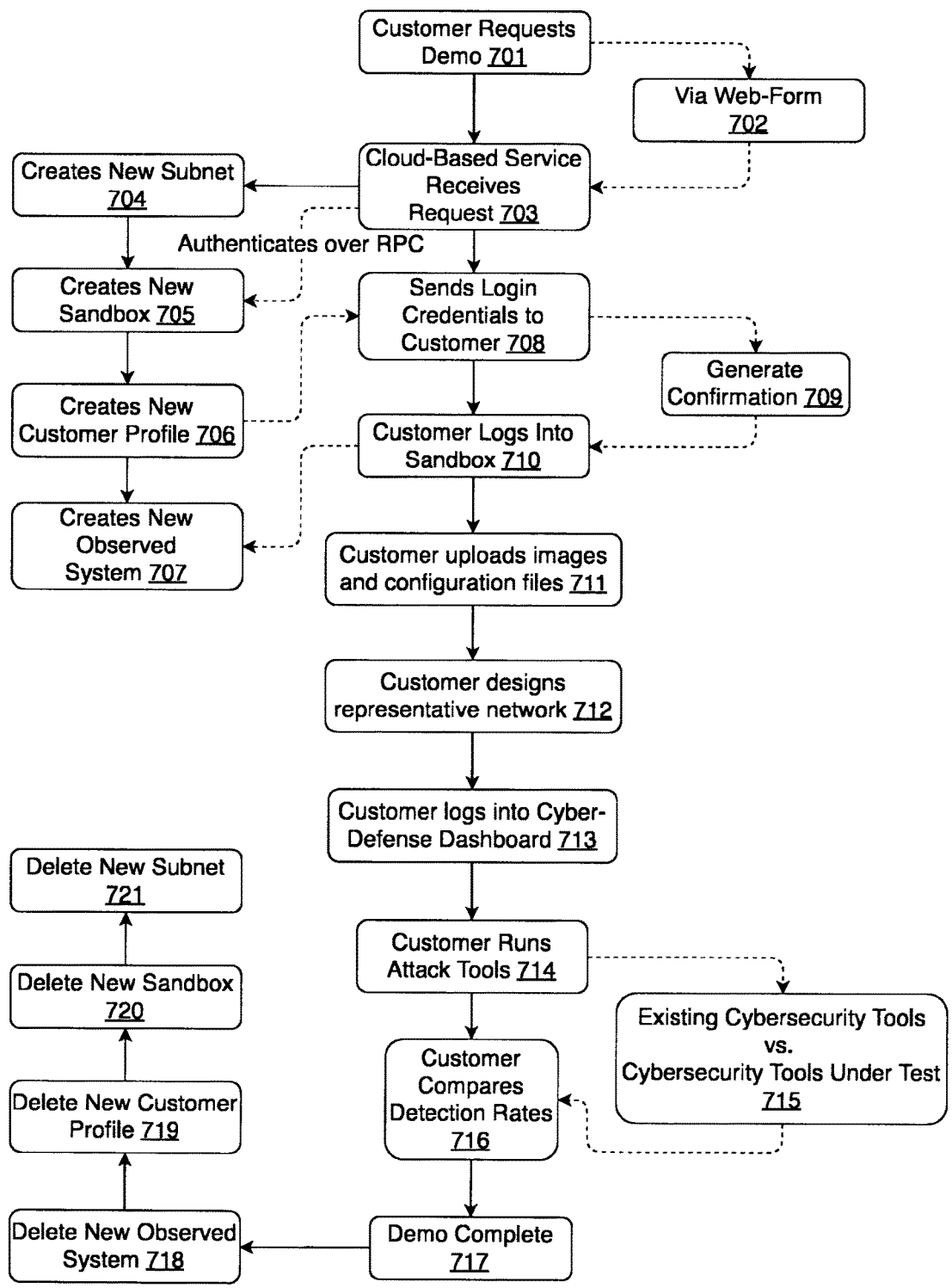
FIG. 7 is an exemplary algorithm for the workflow process for using a secure evaluation platform.

FIG. 7 is an exemplary algorithm for the workflow process for using a secure evaluation platform 600. The process begins when a potential customer requests a demonstration 701 of a cloud-based cyber detection service. This could be done through an online form 702, a written or verbal request, generic demos for conventions, or any other means of gathering information. A customer would need to specify certain technical operating parameters, organizational information, date and times, and desired services. This request could be automated as the request is received 703 by extracting the fields from the web-form and sending a series of automated tasks based on the field's input.

A task to create a subnet 704 and public facing DNS records sufficient for the number of devices requested by the user. A task to instantiate a new sandbox 705 per each customer request. A customer profile 706 including contact information, organization information, and log in credentials needs to be generated, all of which could be requested from the customer in the web-form. Lastly, an observed system 707, i.e., a virtual networking environment, is created within the sandbox.

Another automated task will be to send the log in credentials 708, or a confirmation notification 709 that the system 707 is ready for the user to log in, depending on the configuration. The user may now log in to the sandbox 710 and begin uploading 711 configuration files and settings as well as baseline images from which to build servers or endpoints. According to one embodiment, the user may log in to the virtualized environment over HTTP: Port 80, HTTPS: Port 443, Remote Desktop Protocol (RDP): Port 3389 (TCP), and the baseline images or other large files may use File Transfer Protocol (FTP): Port 21, Trivial File Transfer Protocol (TFTP): Port 69. Other protocols and ports known to those skilled in the art may be utilized depending on the desired speed, security, or other factors determined by the implementing party.

Once all configurations and images are uploaded, the user may then use a user interface to configure, build, assign, and arrange a virtual network 712 representative of their actual real-world one complete with domain controllers, servers, endpoints, and other networked devices. Once complete, the user will engage a button or link (or any other means to activate a batch or script file otherwise known as a silent install in the industry) that will install the necessary cyber-defense agents in their virtual network. With the virtual network complete, the customer may log in to the new offered cyber defense tool offered as a Software-as-a-Service offering which may come in the form of an online dashboard 713. Being isolated from the observed system, the user should be able to log in to the dashboard to find insight into malicious activity tested in the corresponding observed system on the actual real-world network environment. From there, the customer can run a plurality of cyber-attacks 714 and compare the results 716 between the two sets of tools 715.

When the demo is complete, the customer again activates a link in the dashboard to end the demonstration 717. The evaluation system will undo the changes 718, 719, 720, 721 and return the cyber detection system back to pre-sandbox form. All the while the cyber detection system may still provide services to actual customers and additional potential customers as sandboxing requires resources orders of magnitudes smaller than straight virtual environments.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
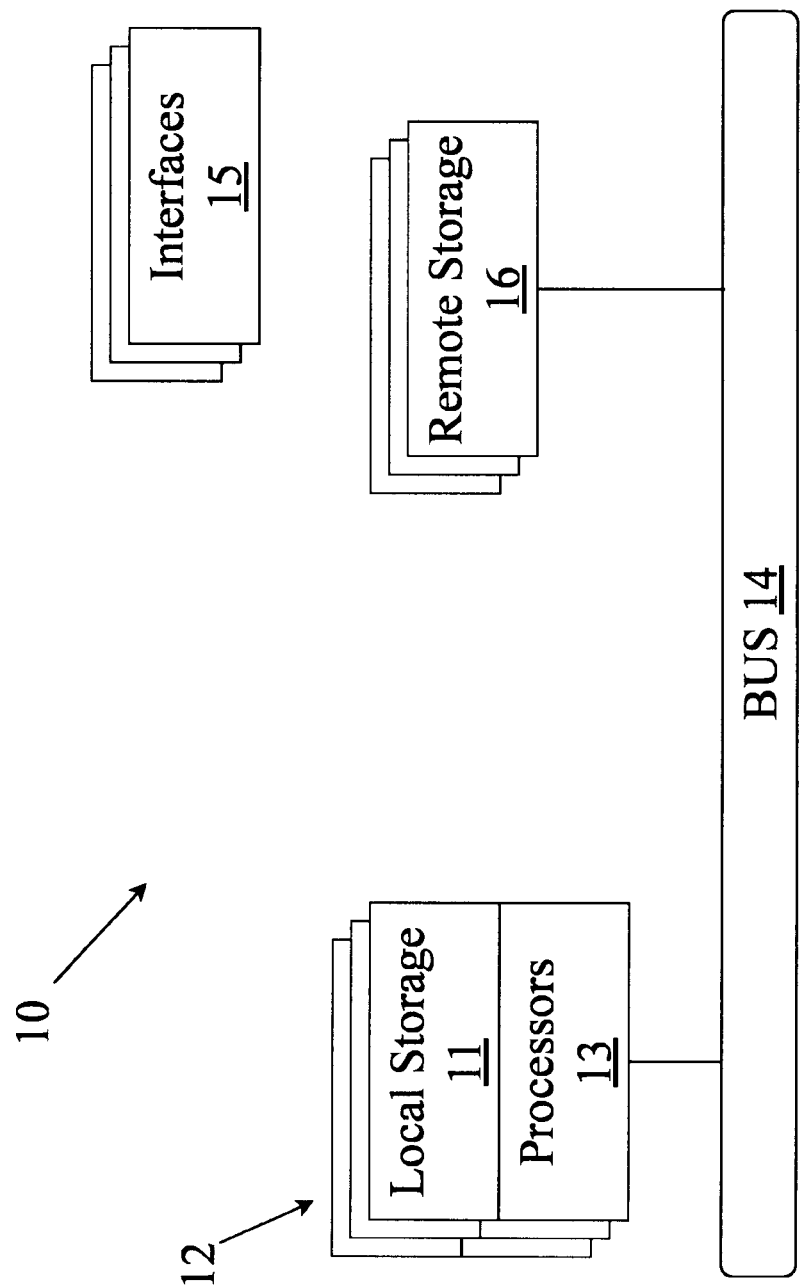
FIG. 8 is a block diagram illustrating an exemplary hardware architecture of a computing device used in various embodiments of the invention.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
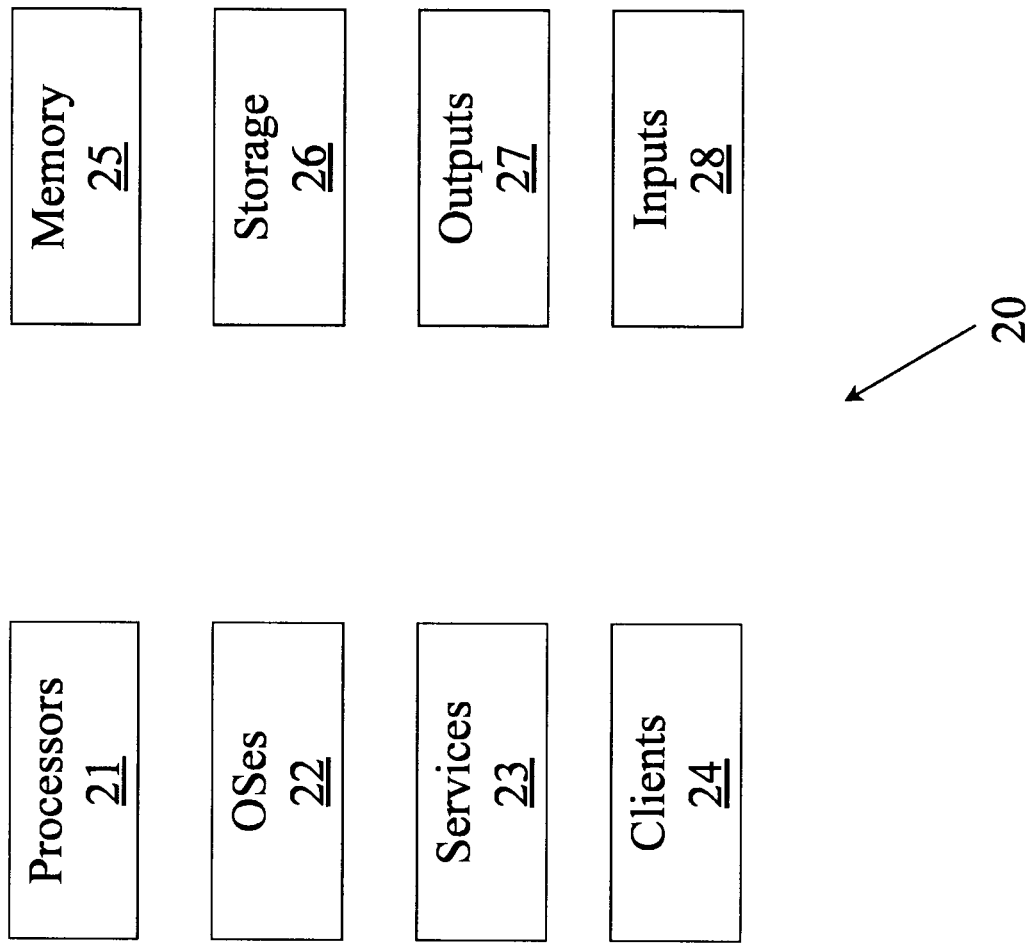
FIG. 9 is a block diagram illustrating an exemplary logical architecture for a client device, according to various embodiments of the invention.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
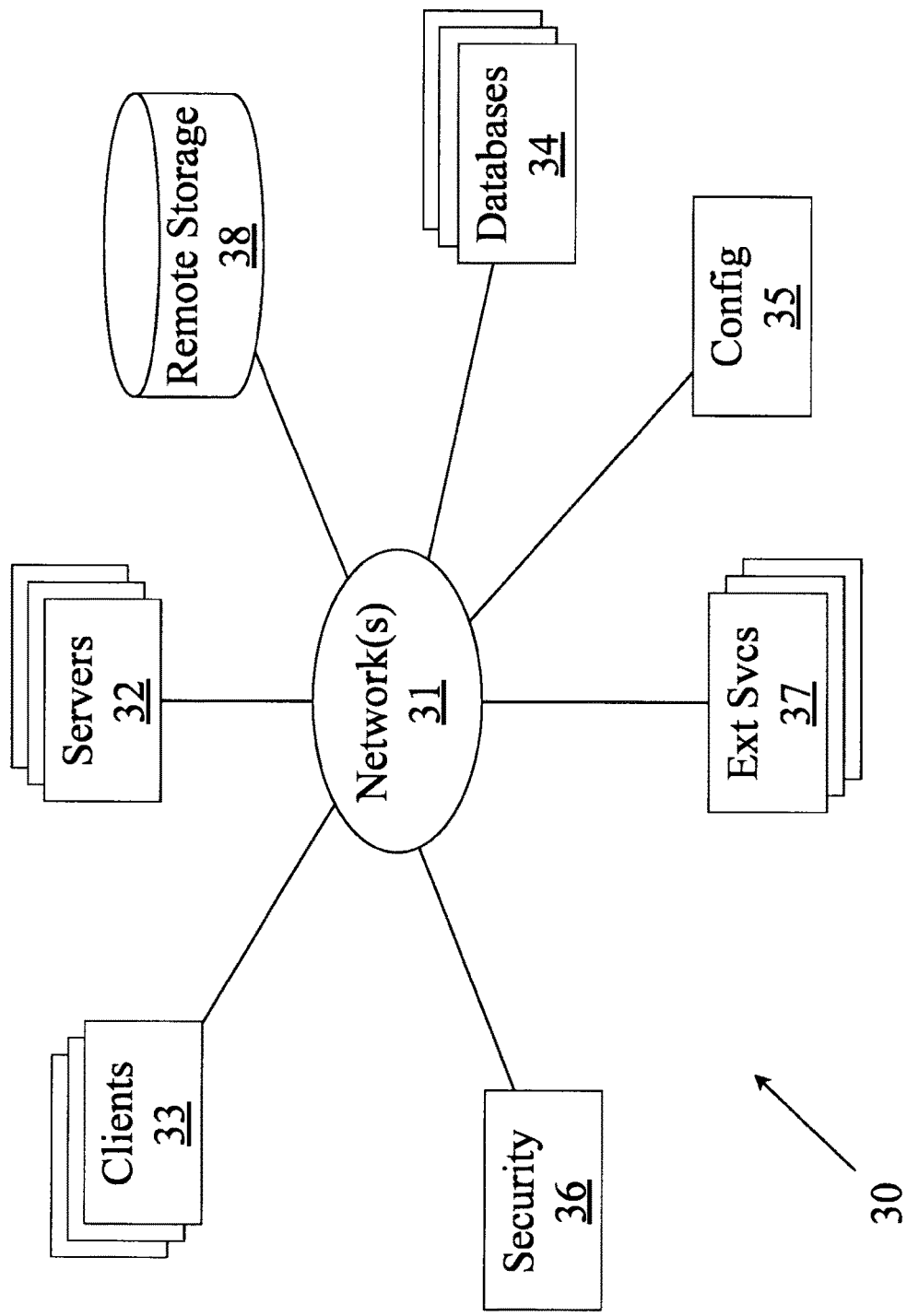
FIG. 10 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other).

Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
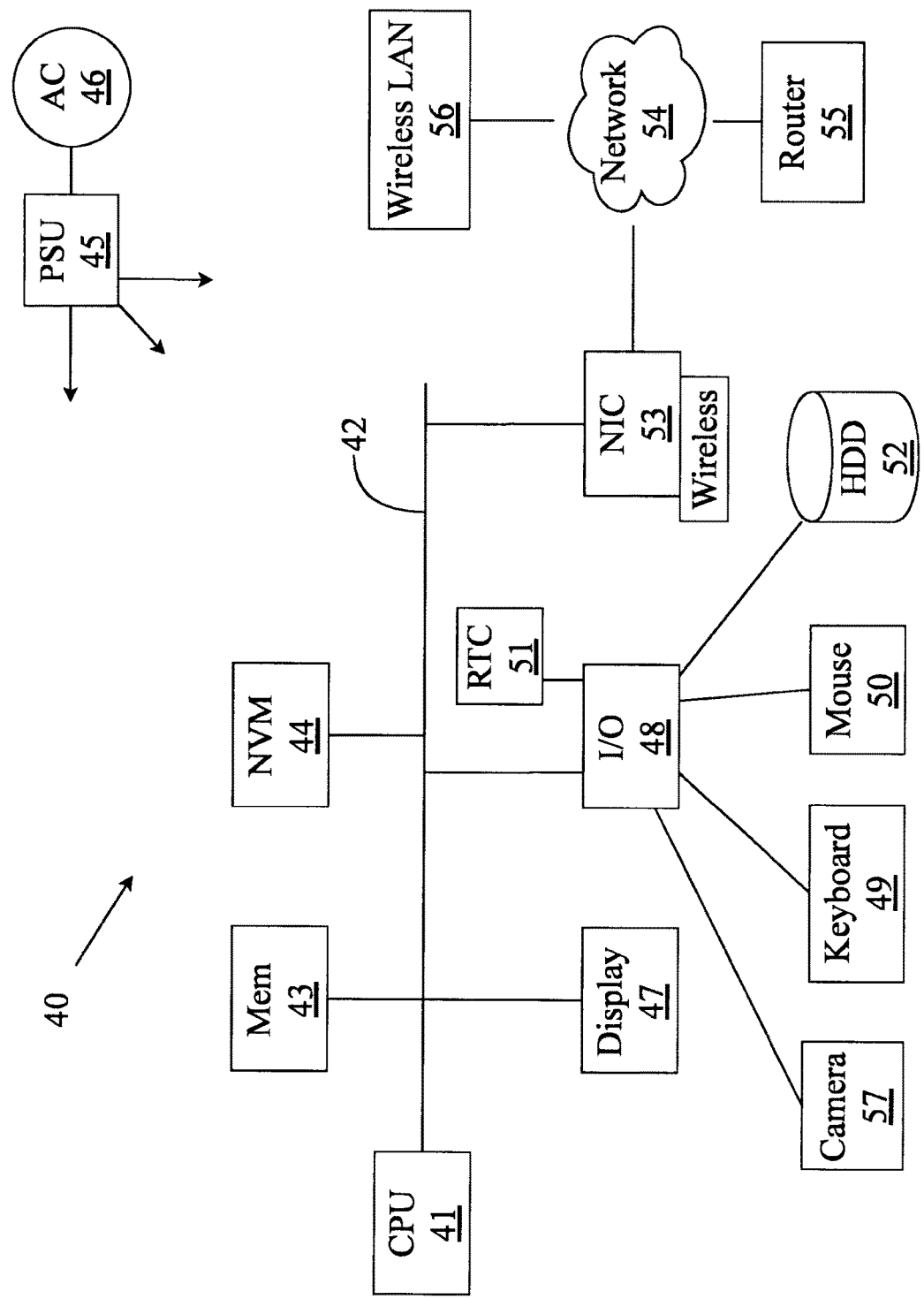
FIG. 11 is another block diagram illustrating an exemplary hardware architecture of a computing device used in various embodiments of the invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for secure evaluation of cybersecurity tools is disclosed, comprising:
   a computing device comprising a memory and a processor;
   a first set of cybersecurity defense tools operating in a production environment and connected to a client's computer network;
   a sandbox environment manager comprising a first plurality of programming instructions stored in the memory and operating on the processor, wherein the first plurality of programming instructions, when operating on the processor, cause the computing device to:
      create a sandbox environment for testing of a virtual computer network, the virtual computer network comprising one or more virtual domain controllers, one or more member servers, and one or more workstations; and
      create an observed system within the sandbox environment, the observed system comprising an isolated instance of the virtual computer network, and a second set of cybersecurity defense tools; and
      a secure tunnel from the observed system to the first set of cybersecurity defense tools;
      wherein the performance of the first and second sets of cybersecurity defense tools is compared when defending against a plurality of cyberattacks within the observed system;
   wherein the sandbox environment is provided with a set of controlled computing resources of the computing device for its operation and is prevented from accessing any other computing resources of the computing device.

2. The system of claim 1, further comprising an observed system manager comprising a second plurality of programming instructions stored in the memory and operating on the processor, wherein the second plurality of programming instructions, when operating on the processor, cause the computing device to:
   operate the observed system as a test of the virtual computer network and the cybersecurity defense tools against the malware;
   allow a user to monitor and change the operation of the observed system during operation; and
   display results from the test of the observed system.

3. The system of claim 1, wherein the observed system comprises a subset of the virtual computer network, and wherein a plurality of simulations of the observed system are carried out each using a different set of initial conditions.

4. A method for secure evaluation of cybersecurity tools is disclosed, comprising the steps of:
   operating a first set of cybersecurity defense tools operating in a production environment connected to a client's computer network;
   creating a sandbox environment for testing of a virtual computer network, the virtual computer network comprising one or more virtual domain controllers, one or more member servers, and one or more workstations;
   creating an observed system within the sandbox environment, the observed system comprising an isolated instance of the virtual computer network, and a second set of cybersecurity defense tools;
   operating the observed system as a test of the virtual computer network and the cybersecurity defense tools against the malware;
   establishing a secure tunnel from the observed system to the first set of cybersecurity defense tools; and
   comparing the performance of the first and second sets of cybersecurity defense tools when defending against a plurality of cyberattacks within the observed system;
   wherein the sandbox environment is provided with a set of controlled computing resources of the computing device for its operation and is prevented from accessing any other computing resources of the computing device.

5. The method of claim 4, further comprising the steps of:
   allowing a user to monitor and change the operation of the observed system during operation; and
   displaying results from the test of the observed system.

6. The method of claim 4, wherein the observed system comprises a subset of the virtual computer network, and wherein a plurality of simulations of the observed system are carried out each using a different set of initial conditions.

* * * * *